United States Patent [19]

Imamura

[11] 4,046,057
[45] Sept. 6, 1977

[54] PROPELLER MILLING MACHINE

[75] Inventor: Yoshiaki Imamura, Hiroshima, Japan

[73] Assignee: Mitsubishi Jukogyo Kabushiki Kaisha, Tokyo, Japan

[21] Appl. No.: 527,739

[22] Filed: Nov. 27, 1974

[30] Foreign Application Priority Data

Jan. 12, 1974  Japan .................................. 49-6788

[51] Int. Cl.² .................................................. B23C 3/18
[52] U.S. Cl. ................................... 90/14; 90/13 A; 90/15 R; 90/17
[58] Field of Search .................. 90/15, 17, 16, 13 A, 90/14; 74/409, 440

[56] References Cited

U.S. PATENT DOCUMENTS

| 1,077,279 | 11/1913 | Ito | 90/13 A |
| 1,937,408 | 11/1933 | Johnson | 90/15 |
| 2,122,662 | 7/1938 | Shaw | 90/13 A |
| 2,499,842 | 3/1950 | Armitage | 90/15 |
| 3,823,645 | 7/1974 | Sukhov et al. | 90/17 |

FOREIGN PATENT DOCUMENTS

| 202,299 | 6/1956 | Australia | 90/15 |
| 609,357 | 1/1935 | Germany | 90/15 |
| 549,479 | 4/1932 | Germany | 90/13 A |
| 93,086 | 1/1960 | Netherlands | 90/13 A |
| 725,662 | 3/1955 | United Kingdom | 90/17 |

Primary Examiner—Francis S. Husar
Assistant Examiner—William R. Briggs
Attorney, Agent, or Firm—Toren, McGeady and Stanger

[57] ABSTRACT

A propeller milling machine having a double-column bridge under which a work to be machined is placed. A plurality of ram assemblies with built-in ram shafts are supported by a horizontal crossrail laid on the bridge so as to traverse horizontally along, and move vertically at right angles to, the crossrail. Each ram assembly carries an extension head with a built-in shaft coupled to the ram shaft. An inclined coupler, at least the upper surface or underside of which is inclined, is turnably disposed between each ram assembly and its extension head, permitting tne latter to be tilted upward or downward. To one end of each extension head is detachably fitted a ball end mill which in turn is coupled to the extension shaft. To the other end of the extension head is swingably connected an angle head having a built-in main spindle coupled at a right angle to the extension shaft thereby to drive a main milling cutter for machining the work, in such a manner that the swing of the angle head causes the cutter to turn or swing about the extension shaft.

3 Claims, 16 Drawing Figures

FIG.9
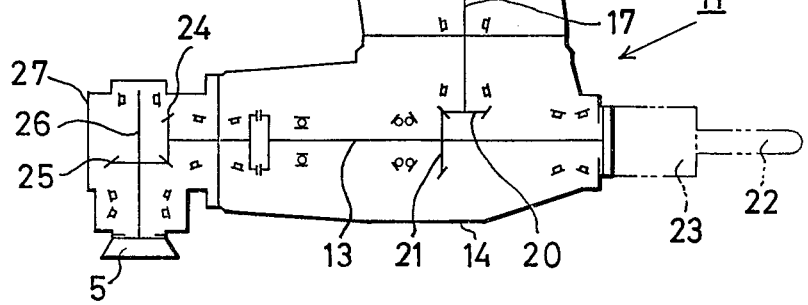
FIG.10
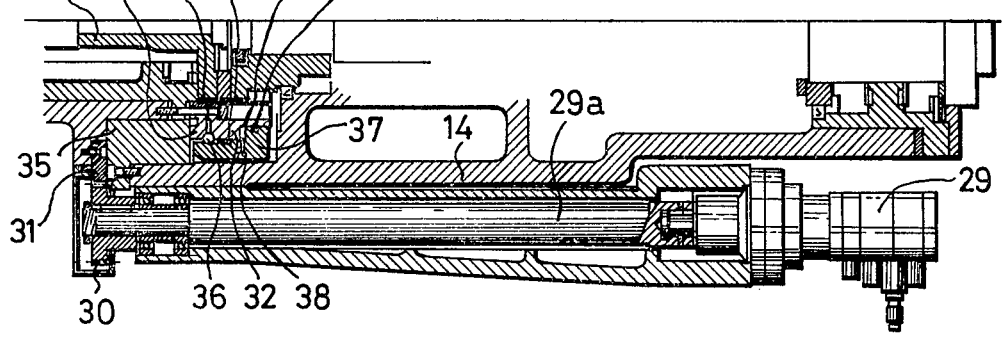
FIG.11
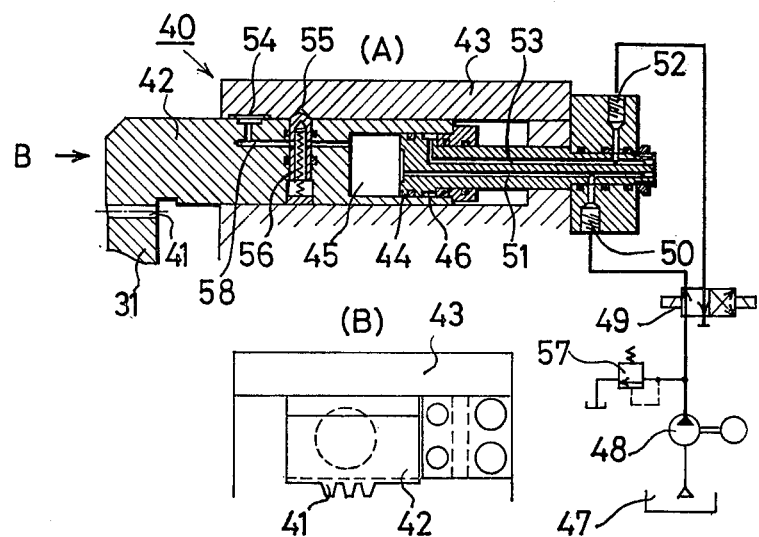

PROPELLER MILLING MACHINE

This invention relates to a propeller milling machine, and more specifically to a machine tool with milling cutters capable of machining the work in conformity with predetermined pitch and rake angles of the propeller blades.

Screw propellers for marine use have blades, as shown in FIG. 2, with a rake angle $\theta_1$, or a slightly rearward slope relative to the hub 2, in addition to a pitch angle $\theta_2$ that the chord of the blade section makes to the rotating plane perpendicular to the hub axis, so that the blade tips are protected from excessively approaching the adjacent hull surface. In machining a work 1 in the manufacture of a marine propeller, therefore, it is necessary to mill the blades 3 by moving the cutting tools so as to maintain the predetermined rake angle $\theta_1$ and pitch angle $\theta_2$. Conventional machine tools for this purpose, as shown in FIG. 1, have milling cutters 5 carried at the lower ends of ram assemblies 4 via extension blocks. When machining the work, the individual ram assemblies are tilted as indicated by imaginary lines to mill the blades 3 to their specified rake angle $\theta_1$. However, because the pitch angle of a propeller varies with the pitch height of the blades, the conventional machining equipment has been unable to drive the cutters 5 to the specified pitch angle $\theta_2$ but perform rough cutting by setting the cutter axes to a mean pitch angle. The work surface S machined in that way, as shown in FIG. 3, is appreciably waved, requiring subsequent correction by hand and hence many extra man-hours for the finishing. In the same Figure, the reference character P denotes the pitch of waving. In addition, the prior art technique of machining inevitably leaves the overlapping portions of the blade roots uncut because of interference.

In view of the foregoing, the present invention has for its object to accomplish numerically controlled machining of marine propellers with milling cutters adapted to move correspondingly to predetermined pitch angle and rake angle of the propeller.

The machine tool according to the invention is characterized in that a plurality of ram assemblies each of which contains a ram shaft are supported by a horizontal crossrail on a double-column bridge standing over a work to be machined as a propeller, said ram assemblies being made movable horizontally along the crossrail and vertically in the directions at right angles to the rail, a plurality of extension heads with built-in extension shafts connected to the ram shafts are supported by the ram assemblies, inclined couplers each of which is inclined at least along its upper surface or underside are turnably connected between the extension heads and ram assemblies, in such a manner that the turning of the individual couplers tilts the extension heads upward or downward, and angle heads are swingably attached to one ends of the extension heads, with their built-in main spindles for driving milling cutters being coupled to the extension shafts perpendicularly thereto, so that the swing of the individual angle heads enables the cutters to turn or swing about the extension shafts.

A further feature of the invention is that ball end mills connected to the extension shafts are detachably secured to the other ends of the extension heads.

The above and other objects, advantages and features of the invention will become apparent from the following description taken in conjunction with the accompanying drawings, wherein:

FIG. 9 is a schematic view of the drive system for the milling head;

FIG. 10 is a sectional view of clamp means for fastening in angle head and an extension head together;

FIG. 11(A) is a sectional view of the backlash eliminator shown in FIG. 6, and FIG. 11(B) is a view as seen in the direction of the arrow B in (A);

Figure 12:
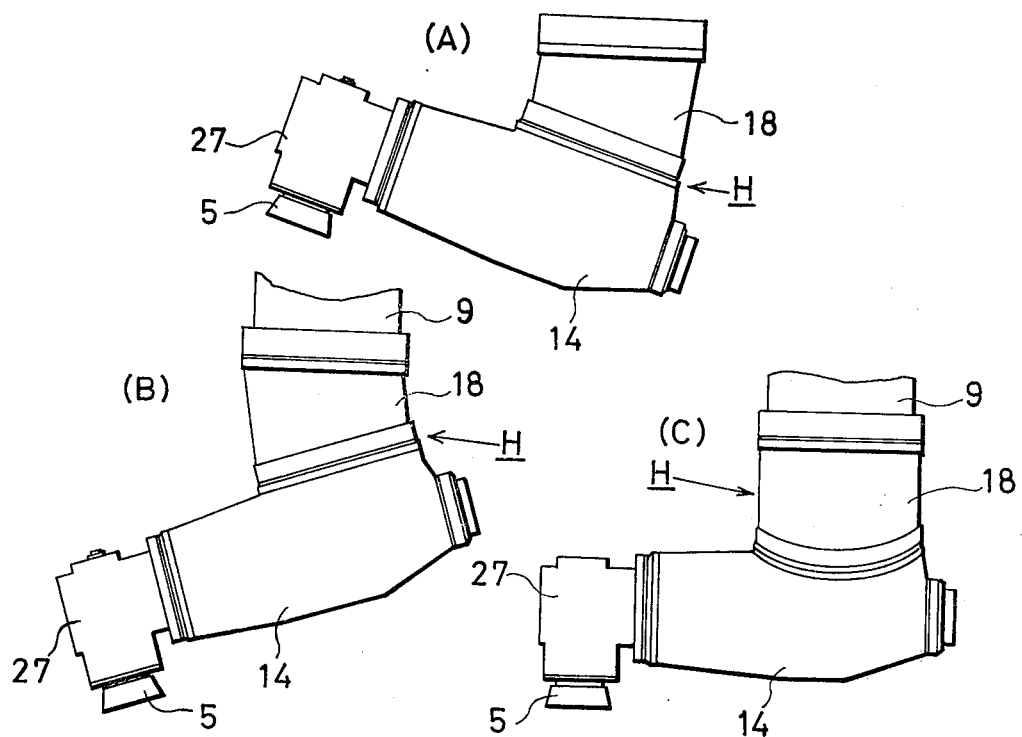
Figure 13:
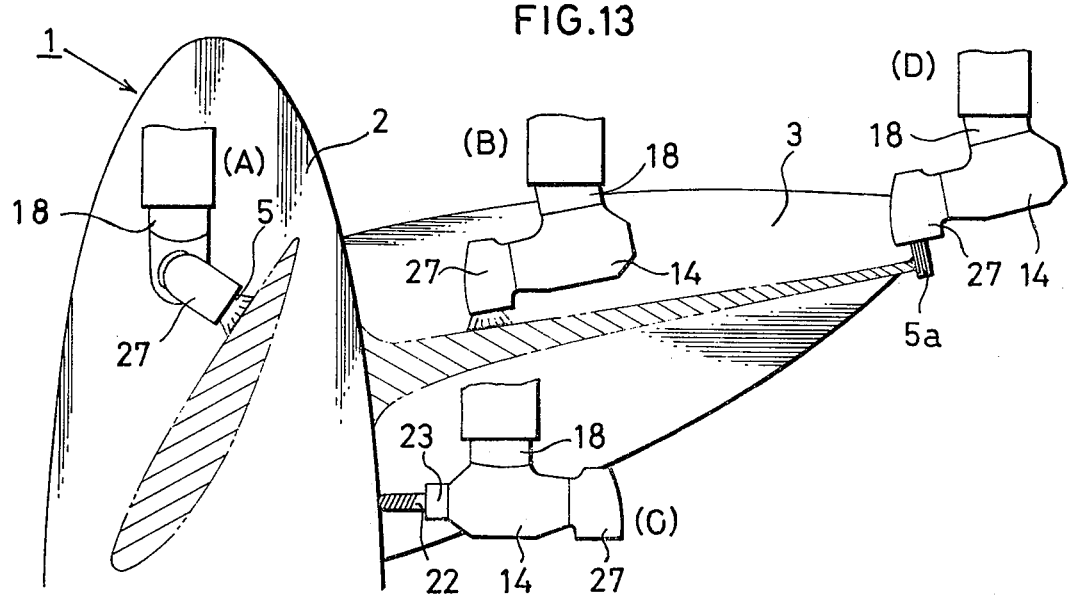

FIGS. 12(A) to (C) are side views of the milling head with the extension head in different positions under posture control by the turning of an inclined coupler; and FIG. 13 is a schematic view showing how a work for propeller is machined in accordance with the invention.

Figure 1:
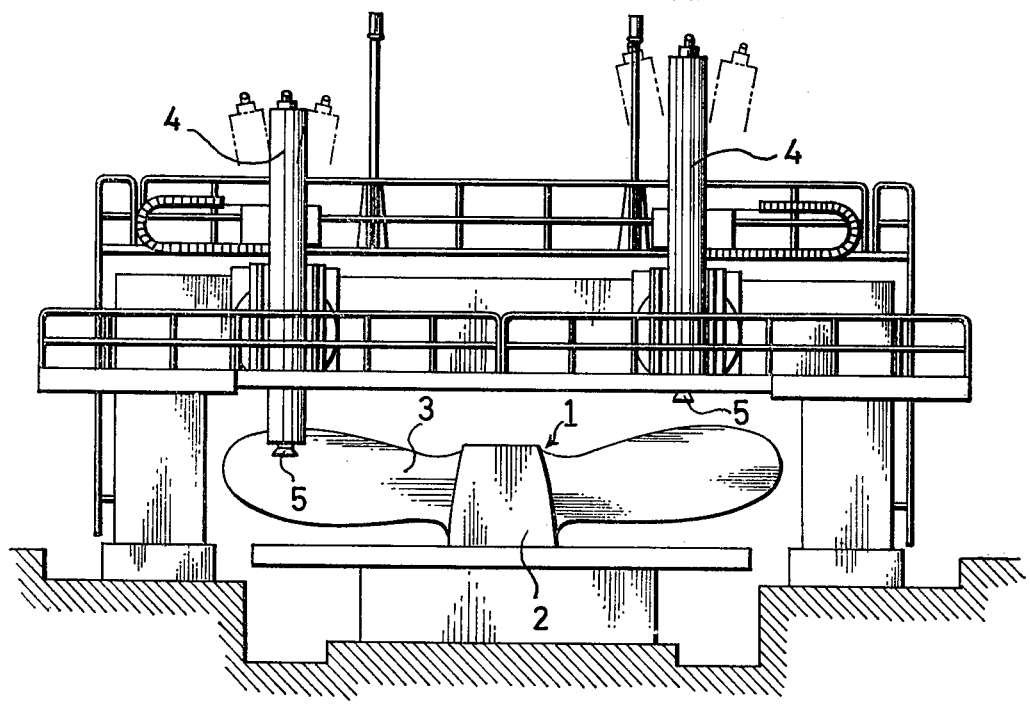
FIG. 1 is a front view of a prior art propeller milling machine.
Figure 2:
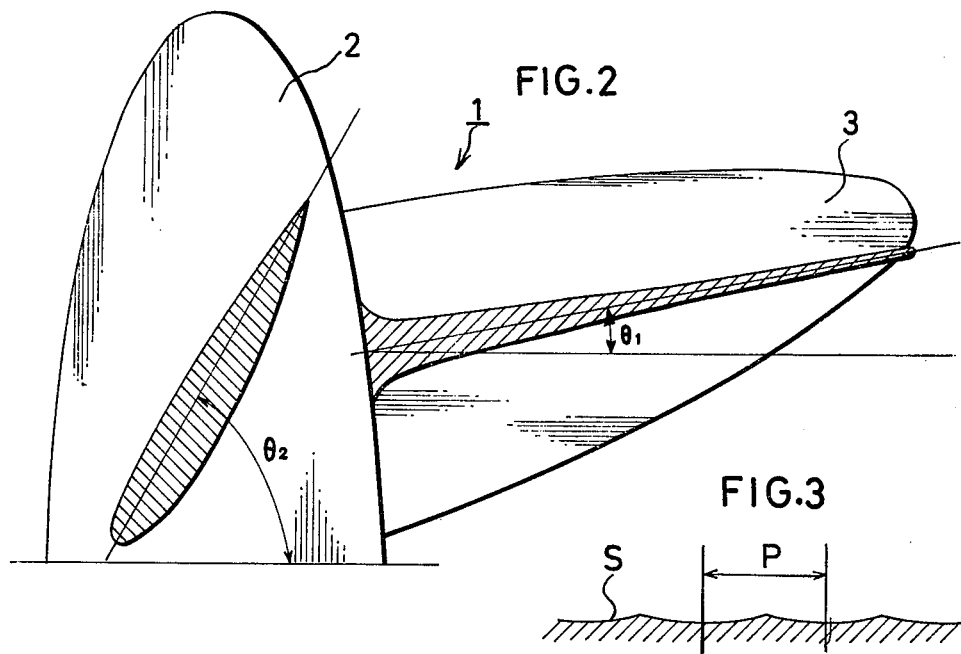
FIG. 2 is a detail of propeller blades indicating their pitch and rake angles.
Figure 3:
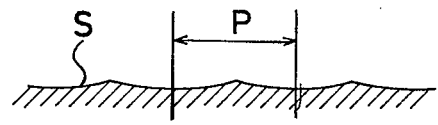
FIG. 3 is a sectional view of a conventionally machined surface.
Figure 4:
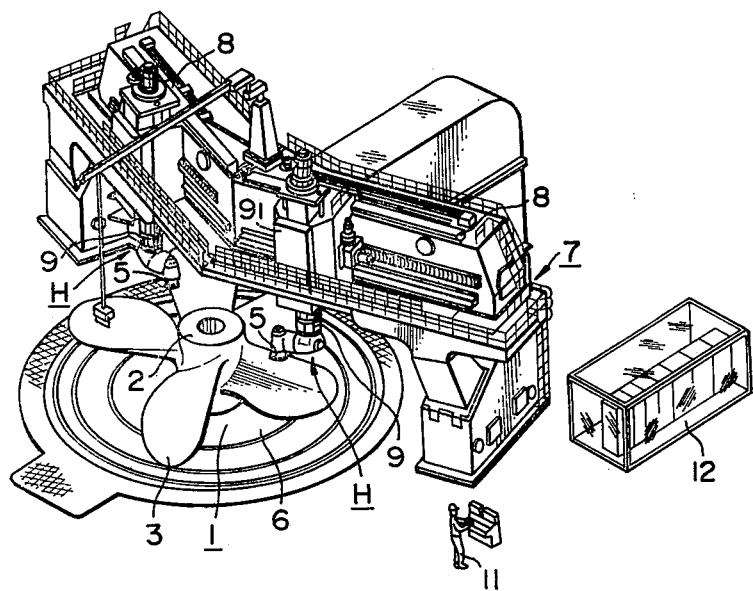
FIG. 4 is a general view, in perspective, of a machine tool arrangement for machining a propeller in accordance with the present invention.
Figure 5:
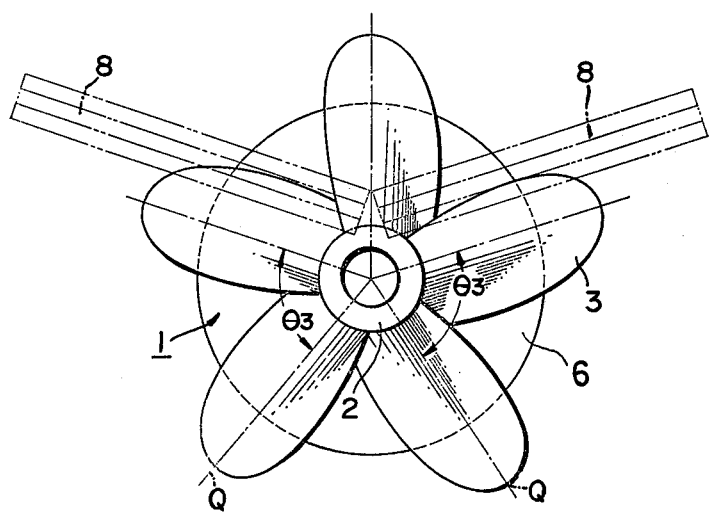
FIG. 5 is a plan view of a five-bladed propeller with its pitch lines.

Referring specifically to FIG. 4, which is a general view of a machine tool arrangement of milling a propeller, there are shown a turntable 6 carrying the work 1 thereon, and a double-column bridge 7 over the work. As shown better in FIG. 5, a crossrail 8 provided on the bridge 7 is horizontally bent in the form of a shallow V, at an angle corresponding to the angle $\theta_3$ that the pitch lines Q of each two adjacent blades 3 of the propeller make. In the embodiment illustrated, the work 1 has five blades 3, each two of which making a pitch line angle of 72°, and hence the crossrail 8 is bent at an angle of 144°. This means the machine's ability of simultaneously machining two blades 3 with separate cutters as the turntable 6 rotates.

Figure 7:
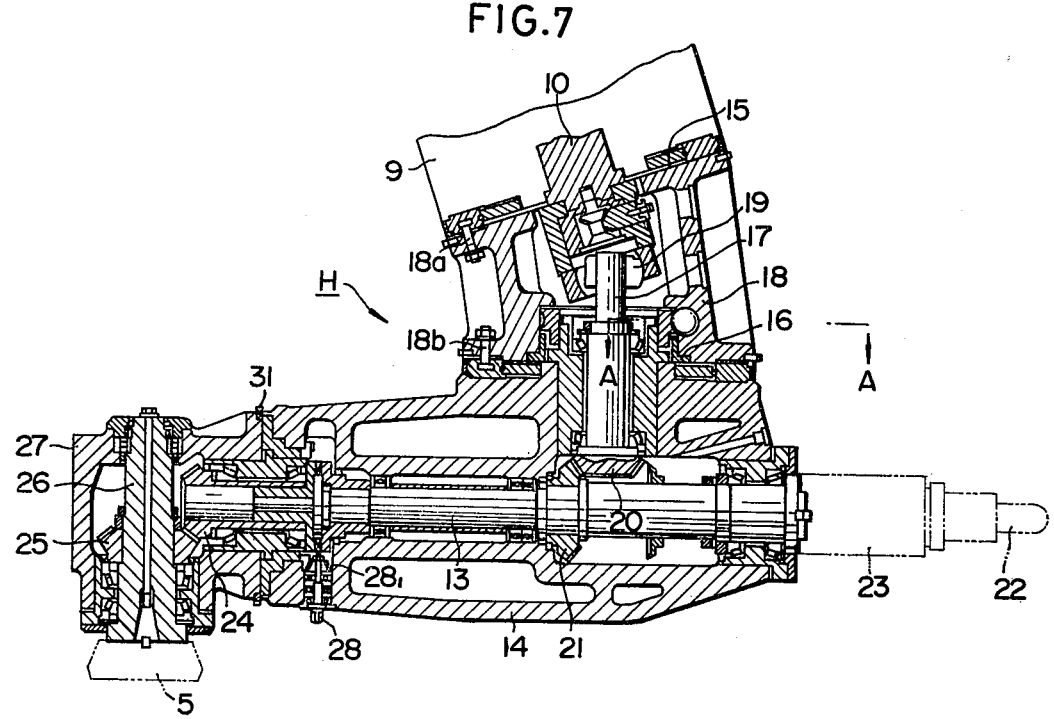
FIG. 7 is a longitudinal view, in vertical section, of the milling head shown in FIG. 6.

The crossrail 8 supports two ram assemblies 9, which can traverse thereon horizontally and move up and down at right angles to the rail by usual elevator means $9_1$. As FIG. 7 shows, each ram assembly 9 houses a motor-driven ram shaft 10. As viewed in FIG. 4, the tool arrangement is attended by a single operator 11 and the machining operation is numerically controlled by a series of numerically coded instructions from a punched tape in a remote control chamber 12.

Figure 8:
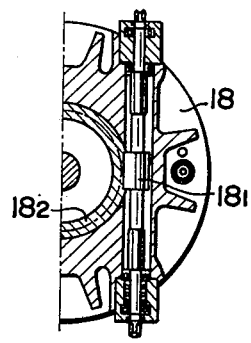
FIG. 8 is a sectional view taken on the line A—A in FIG. 7.

Each ram assembly 9 carries an extension head 14 with a built-in extension shaft 13 coupled to the ram shaft 10. The ram assembly and the extension head are connected by an inclined coupler 18, which is turnable and is trapezoidal in cross section with at least one of its horizontal planes, i.e., its upper surface 15 or underside 16, inclined relative to the other plane. This coupler has a built-in shaft 17 for coupling the ram shaft 10 to the extension shaft 13. Although both the upper and lower surfaces 15, 16 of the inclined coupler 18 in the embodiment shown are inclined with respect to the sides, either surface along may be inclined instead, as already noted. Clamping bolts 18a, 18b fasten the inclined coupler 18, ram assembly 9, and extension head 14 together. The ram shaft 10 and the inclined-coupler shaft 17 are coupled by a universal joint 19 that permits the both shafts to change their relative positions freely. The inclined-coupler shaft is drivingly coupled to the extension shaft 13 by means of bevel gears 20, 21 mounted on the respective shaft ends, in mesh with each other. The inclined coupler 18 is made turnable, as shown in FIG. 8, by a worm $18_1$ and a worm wheel $18_2$ in engagement. A ball end mill 22 connectable to the extension shaft 13 is detachably attached to one end of the extension head 14 via an extension block 23. To the other end of the extension head is swingably connected an angle head 27, which contains a main spindle 26 extending at right angles to the extension shaft 13. The main spindle 26 is coupled to the extension shaft by bevel gears 24, 25 so as to drive a main cutter 5 for milling propeller blade surfaces. Thus, the cutter 5 is swingable and turnable about the extension shaft 13.

Figure 6:
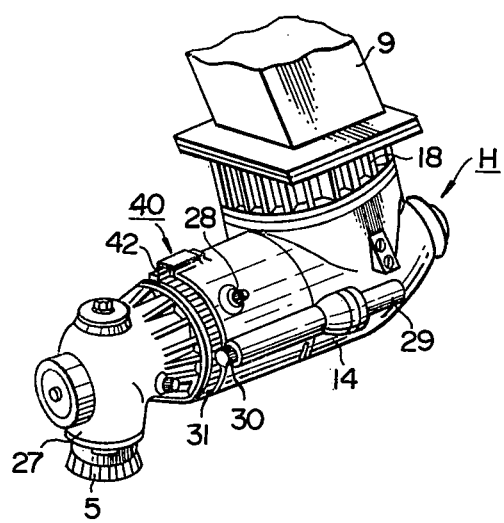
FIG. 6 is a perspective outward view of the milling head shown in FIG. 4.

For manual position control of the angle head 27, a handle shaft 28 adapted for connection to a handle (not shown) is fitted in a bore of the extension head 14. The rotation of the shaft 28 can be transmitted to the angle head 27 through a bevel gear $28_1$. When the angle head is to be swung manually, the handle shaft 28 is rotated by hand. For power drive, an inching motor 29 as shown in FIG. 6 is mounted on the extension head 14, and a pinion 30 driven by the motor is meshed with a reduction gear 31 on the angle head 27. The motor 29 is capable of automatically stopping in a predetermined position after each revolution. The index angle per revolution of the motor is, of course, decreased by increasing the speed reduction ratio of the reduction gear 31. The drive system for the milling head H with the foregoing construction is as represented in FIG. 9.

FIG. 10 shows an example of clamp means for fastening the angle head 27 to the extension head 14. A piston 32 is made fast to the rear end of the angle head 27, and a circular groove 33 formed in the piston 32 provides a flexible contacting part 34 of the piston. In order that the part 34 aids in fastening the angle head 27 and the extension head 14 together, a sleeve 35 adapted to contact the end of the contacting part 34 is secured to the extension head 14. A cylinder 37 having an inclined surface for contact with an annular row of steel balls 36 is provided outwardly of the piston 32, so that the contacting part 34 can be pressed against the sleeve 35 by forcing the balls arranged on the periphery of the groove 33 toward its axis. To supply hydraulic fluid to a chamber 39 defined between the cylinder 37 and the piston 32, a fluid inlet port 38 is formed in the cylinder. Oil seals 37a, 37b are provided to ensure fluidtightness of the chamber 39.

As indicated in FIG. 6, the extension head 14 is equipped with a backlash eliminator 40, which is shown in section in FIG. 11. A slider 42 formed with teeth 41 at its free end in mesh with the reduction gear 31 is slidably accommodated in a support member 43. For the reciprocating motion of the slider 42 in the support member 43, a stationary piston 44 is inserted into a cylindrical hollow of the slider, dividing the hollow into a first fluid chamber 45 and a second fluid chamber 46. The backlash eliminator further includes a hydraulic power unit, which in turn comprises a hydraulic fluid tank 47, a relief valve 57, a hydraulic pump 48, and a directional control valve 49. The stationary piston 44 has an axial fluid passage 51 for conducting the fluid from the hydraulic unit through a first port 50 to the first fluid chamber 45, and a similar passage 53 for conducting the fluid from the unit through a second port 52 to the second chamber 46. The support member 43 is provided with a pad 54 to give an additional force to press the slider 42 against the reduction gear 31 when the slider has moved ahead with its teeth 41 into engagement with the reduction gear 31. A directional control valve 56 is installed in the slider 42 to supply pressure fluid to the pad 54. The valve 56 fits in a notch 55 formed in the support member 43 when the slider 42 is engaged with the reduction gear 31, thus establishing communication between the first fluid chamber 45 and the pad 54, through a passage 58.

In order to drive each milling cutter 5, the rotation of a motor not shown is transmitted to the associated ram shaft 10, and thence to the coupler shaft 17 via the universal joint 19. The rotation of the shaft 17, in turn, is transmitted to the extension shaft 13 through the bevel gears 20, 21. The rotation of the shaft 13 is likewise conveyed through the bevel gears 24, 25 to the main spindle 26 of the angle head 27 so as to drive the cutter 5.

Before machining the work by means of the running cutter 5, the tool has to be preset to the desired rake angle $\theta_1$ and pitch angle $\theta_2$. The adjustments are made by turning the inclined coupler. For this purpose the clamping bolts 18a, 18b are loosened to allow the coupler 18 to turn, tilting the extension head 14 upward or downward to an angle corresponding to the desired rake angle $\theta_1$.

FIG. 12 shows some typical working positions of the extension head 14 tilted under posture control by the inclined coupler 18. The extension head is tilted upward in (A), downward in (B), and is at a level in (C).

The adjustment to the given pitch angle $\theta_2$ is accomplished manually or automatically. Manual setting is done by turning the handle shaft 28 so that the angle head 27 swings to an angle corresponding to the desired pitch angle $\theta_2$ with the turning of the cutter 5 about the extension shaft 13. For automatic setting, the motor 29 is used. As shown in FIG. 10, the rotation of the motor 29 is transmitted through a shaft 29a and pinion 30 in mesh with a reduction gear 31 to the angle head 27, so that the cutter 5 carried thereby is swung about the extension shaft 13.

When the angle head 27 is to be fastened to the extension head 14 by the clamp means shown in FIG. 10, the cutter angle corresponding to the pitch angle $\theta_2$ is first indexed, and pressure fluid is supplied to the fluid chamber 39 through the inlet port 38. Consequently, the cylinder 37 is axially moved, with its inclined surface forcing the steel balls 36 toward the axial center. This urges the balls into the groove 33 so as to expand the latter and deform the flexible contacting part 34 toward the sleeve 35. The sleeve and the piston 32 are thereby pressed against each other, and the angle head 27 and the extension head 14 are clamped together.

For the removal of backlash from between the reduction gear 31 held stationary and the teeth 41 of the slider 42 in mesh therewith, the backlash eliminator shown in FIG. 11 is operated in the following way. First, the angle of the cutter 5 is indexed correspondingly to the given pitch angle $\theta_2$, and fluid from the hydraulic fluid tank 47 is supplied to the first chamber 45 via the first port 50 and the passage 51, while the fluid in the second chamber 46 is drained through the passage 53 and the second port 52. This forces the slider 42 forward to the point where its teeth 41 mesh with the reduction gear 31. At this point, the directional control valve 56 fits under spring force into the notch 55, thus permitting the fluid to flow from the first chamber 45 into the pad 54 by way of the passage 58. The fluid pressure in the pad 54, upon rising to the value preset by the relief valve 57, imparts the slider 42 with a downward pressure with which the slider engages securely with the reduction gear 31. This makes possible the elimination of any backlash between the gear and the teeth 41 of the slider 42.

Machining of the work is performed in the following manner. The blade surfaces are milled to the given rake angle $\theta_1$ and pitch angle $\theta_2$ as illustrated in FIGS. 13(A), (B). To machine the outer periphery of the propeller hub 2, the extension block 23 and the ball end mill 22 are employed as shown in FIG. 13(C). Blade tips are milled by means of the end mill cutter 5a as in FIG. 13(D). In machining operations that do not require the ball end mill 22, the mill may be detached together with the extension block 23 from the extension head, the exposed end of the head being capped instead.

According to the present invention, as already noted, the inclined coupler with at least one inclined plane, top or bottom, is turnably interposed between the extension head and the ram assembly supporting the head. Therefore, the extension head can be tilted upward or downward, as desired, by turning the inclined coupler. The milling cutter carried by the angle head at the front end of the extension head can be accordingly tilted to an angle corresponding to the rake angle of the propeller blades. Also, because it is swingable about the shaft in the extension head, the milling cutter can be tilted to machine the work along curves within close tolerances for given curves corresponding to the specified pitch angle of the blades. These features make it possible to minimize the waviness of the machined surface, increase the pitch of machining, and shorten the distance of machining locus, with a remarkable reduction in the number of runs for machining operation.

Moreover, the ball end mill attachable to the end of each extension head opposite to the end carrying the angle head, machines the outer periphery of the propeller hub. Last but not least, the fact that the milling cutter inclination can be automatically varied according to the blade pitch height, renders it possible to realize automatic propeller machining operation under numerical control.

What is claimed is:

1. A propeller milling machine comprising a double-column bridge under which a work is to be placed, a horizontal crossrail laid on the bridge, a plurality of ram assemblies, each assembly containing a corresponding shaft, said plurality of assemblies supported by the crossrail to traverse horizontally thereon and to move vertically at right angles to the rail, a plurality of extension heads each with a built-in extension shaft coupled to the associated ram shaft, a plurality of inclined couplers each of which has at least one inclined face and is turnably interposed between each ram assembly and the associated extension head, and a plurality of angle heads, each angle head swingably connected to a corresponding extension head, each of said angle heads having a built-in main spindle rotatably coupled to the extension shaft at right angles thereto for driving a milling cutter also carried by the angle head and wherein said clamp means includes a piston made fast to the rear end of each angle head, said piston being formed with a diametral groove, an annular row of steel balls movable in the groove toward the axis, a flexible contacting part, a sleeve secured to the extension head while in contact with the contacting part, and a cylinder having a inclined plane for contact with the steel balls, said piston and cylinder wall defining hydraulic fluid chambers in the cylinder.

2. A propeller milling machine comprising a double-column bridge under which a work is to be placed, a horizontal crossrail laid on the bridge, a plurality of ram assemblies, each assembly containing a corresponding shaft, said plurality of assemblies supported by the crossrail to traverse horizontally theron and to move vertically at right angles to the rail, a plurality of extension heads each with a built-in extension shaft coupled to the associated ram shaft, a plurality of inclined couplers each of which has at least one inclined face and is turnably interposed between each ram assembly and the associated extension head, and a plurality of angle heads, each angle head swingably connected to a corresponding extension head, each of said angle heads having a built-in main spindle rotatably coupled to the extension shaft at right angles thereto for driving a milling cutter also carried by the angle head and wherein said machine also includes backlash eliminators disposed between the angle heads and the extension heads, one for each head combination.

3. A machine according to claim 2 wherein each of said backlash eliminators includes a slider formed with teeth adapted to mesh with a reduction gear, a support member within which the slider is reciprocatingly slidable, a stationary piston inserted into a hollow of the slider, said stationary piston and slider defining first and second fluid chambers in the slider, said piston being formed with passages communicating the first and second chambers to a hydraulic fluid source, a pad for forcing the teeth into pressure contact with the reduction gear when the slider has moved ahead with its teeth into mesh with the gear, and a directional control valve connecting the pad with the first fluid chamber.

* * * * *